US012323323B1

(12) United States Patent
Lev Ran et al.

(10) Patent No.: US 12,323,323 B1
(45) Date of Patent: Jun. 3, 2025

(54) CONVEYING CONTEXTUAL INFORMATION ACROSS CLUSTERS

(71) Applicant: International Business Machines Corporation, Armonk, NY (US)

(72) Inventors: Etai Lev Ran, Nofit (IL); Dean Har'el Lorenz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 18/528,483

(22) Filed: Dec. 4, 2023

(51) Int. Cl.
*H04L 45/00* (2022.01)
*H04L 12/46* (2006.01)

(52) U.S. Cl.
CPC .......... *H04L 45/46* (2013.01); *H04L 12/4633* (2013.01)

(58) Field of Classification Search
CPC .............................. H04L 45/46; H04L 12/4633
See application file for complete search history.

(56) References Cited

U.S. PATENT DOCUMENTS

| | | | |
|---|---|---|---|
| 10,348,619 | B2 | 7/2019 | Pfaff |
| 11,074,091 | B1* | 7/2021 | Nayakbomman ....... G06F 9/455 |
| 11,481,243 | B1 | 10/2022 | Wang et al. |
| 11,558,426 | B2 | 1/2023 | Shen et al. |
| 2021/0243164 | A1* | 8/2021 | Murray ............... H04L 41/0806 |
| 2021/0328913 | A1* | 10/2021 | Nainar ................. H04L 45/745 |
| 2022/0255902 | A1* | 8/2022 | Woodson ............. H04L 63/029 |
| 2023/0079209 | A1* | 3/2023 | Nallamothu ........ H04L 12/4625 |
| | | | 709/238 |

FOREIGN PATENT DOCUMENTS

| | | |
|---|---|---|
| CN | 113641503 A | 11/2021 |
| CN | 115134358 A | 9/2022 |
| WO | 2022232445 A2 | 11/2022 |

OTHER PUBLICATIONS

Anonymous, "Policies and Metrics Driven Workload Distribution on MultiCloud Kubernetes Like Deployments Enforced by Blockchain Consensus," IP.com Prior Art Database, Technical Disclosure No. IPCOM000265370D, Apr. 2, 2021, 5 pages.
Collin, W., "Automation in Multi-Domain Software-Defined Networking: Overview and Use Cases," Matheo, University of Liege—Faculy of Applied Sciences, Master Thesis, 2021, 91 pages.
Johnston et al., "Towards an Approximation-Aware Computational Workflow Framework for Accelerating Large-Scale Discovery Tasks," arXiv, 2022, 8 pages, retrieved from https://arxiv.org/abs/2206.06217.

(Continued)

*Primary Examiner* — Benjamin M Thieu
(74) *Attorney, Agent, or Firm* — Zilka-Kotab, P.C.

(57) ABSTRACT

A computer-implemented method, according to one approach, includes: receiving a tunnel request at a service cluster from a client at a remote cluster. The received tunnel request includes metadata associated with the client at the remote cluster. The computer-implemented method further includes using the metadata to establish a surrogate pod at the service cluster that replicates the client at the remote cluster. A tunnel identifier corresponding to the established surrogate pod is returned to the remote cluster. Moreover, in response to receiving a service request that includes the tunnel identifier, the service request is directed to the surrogate pod.

20 Claims, 7 Drawing Sheets

(56) References Cited

OTHER PUBLICATIONS

Vu, "Predictive Hybrid Autoscaling for Containerized Applications," IEEE Access, vol. 10, Oct. 14, 2022, pp. 109768-109778.

Istio, "Multi-cluster Traffic Management," Istio, 2023, 3 pages, retrieved from https://istio.io/latest/docs/ops/configuration/traffic-management/multicluster/.

Rishi, G., "Kubernetes Multi-cluster and Multi-tenancy with Kasten K10 3.0," Kasten by Veeam, 2023, 11 pages, retrieved from https://www.kasten.io/kubernetes/resources/blog/tag/data-management/kubernetes-multi-cluster-and-multi-tenancy-with-kasten-k10.

Bhatt, U., "Using Calico to create a Kubernetes cluster mesh for multi-cluster environments," Tigera, Technical Blog, Nov. 22, 2022, 14 pages, retrieved from https://www.tigera.io/blog/using-calico-to-create-a-kubernetes-cluster-mesh-for-multi-cluster-environments/.

Cilium, "Deep Dive into Cilium Multi-cluster," Cilium, Mar. 18, 2019, 15 pages, retrieved from https://cilium.io/blog/2019/03/12/clustermesh/.

Google, "Multi-cluster Services," Google Cloud, 2023, 2 pages, retrieved from https://cloud.google.com/kubernetes-engine/docs/concepts/multi-cluster-services.

Thorpe, S., "Kubernetes Multi-Cluster Management and Governance," DZone, 2023, 13 pages, retrieved from https://dzone.com/refcardz/kubernetes-multi-cluster-management-and-governance.

* cited by examiner

CONVEYING CONTEXTUAL INFORMATION ACROSS CLUSTERS

BACKGROUND

The present invention relates to declarative computing environments, and more specifically, this invention relates to utilizing surrogate pods to convey contextual information across clusters.

As computing power continues to advance and the use of IoT devices becomes more prevalent, the amount of data regularly produced continues to increase. For instance, the rise of smart enterprise endpoints has led to large amounts of data being generated at remote locations. Data production will only further increase with the growth of 5G networks and an increased number of connected mobile devices. This has also become more prevalent as the complexity of machine learning models increases. Increasingly complex machine learning models translate to more intense workloads and increased strain associated with applying the models to received data.

In an effort to address the continued increase of data production, distributed systems have been developed to improve the availability and scalability of compute based services to users. For instance, a number of nodes that are spread across a distributed system may be combined logically into a common cluster of nodes.

Each of the nodes may represent a virtual or physical machine, thereby providing distributed compute power that may be used in parallel to process requests that are received from clients. A node may provide this processing throughput by managing a number of pods, where each of the pods further include one or more containers. These pod containers may be used to host the code and dependencies that are associated with running an application. In other words, the cluster of nodes are able to run containerized applications. These distributed systems thereby serve as container orchestration platforms.

Although container orchestration platforms are able to increase the availability and scalability of compute based services, conventional platforms have limited transparency between the different clusters therein. For instance, conventional platforms are unable to pass any contextual information across cluster boundaries. Thus, service requests that are received at a cluster in conventional platforms do not include any information about the pod(s) that originally issued the service request.

SUMMARY

A computer-implemented method, according to one approach, includes: receiving a tunnel request at a service cluster from a client at a remote cluster. The received tunnel request includes metadata associated with the client at the remote cluster. The computer-implemented method further includes using the metadata to establish a surrogate pod at the service cluster that replicates the client at the remote cluster. A tunnel identifier corresponding to the established surrogate pod is returned to the remote cluster. Moreover, in response to receiving a service request that includes the tunnel identifier, the service request is directed to the surrogate pod.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a processor, as well as logic that is integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
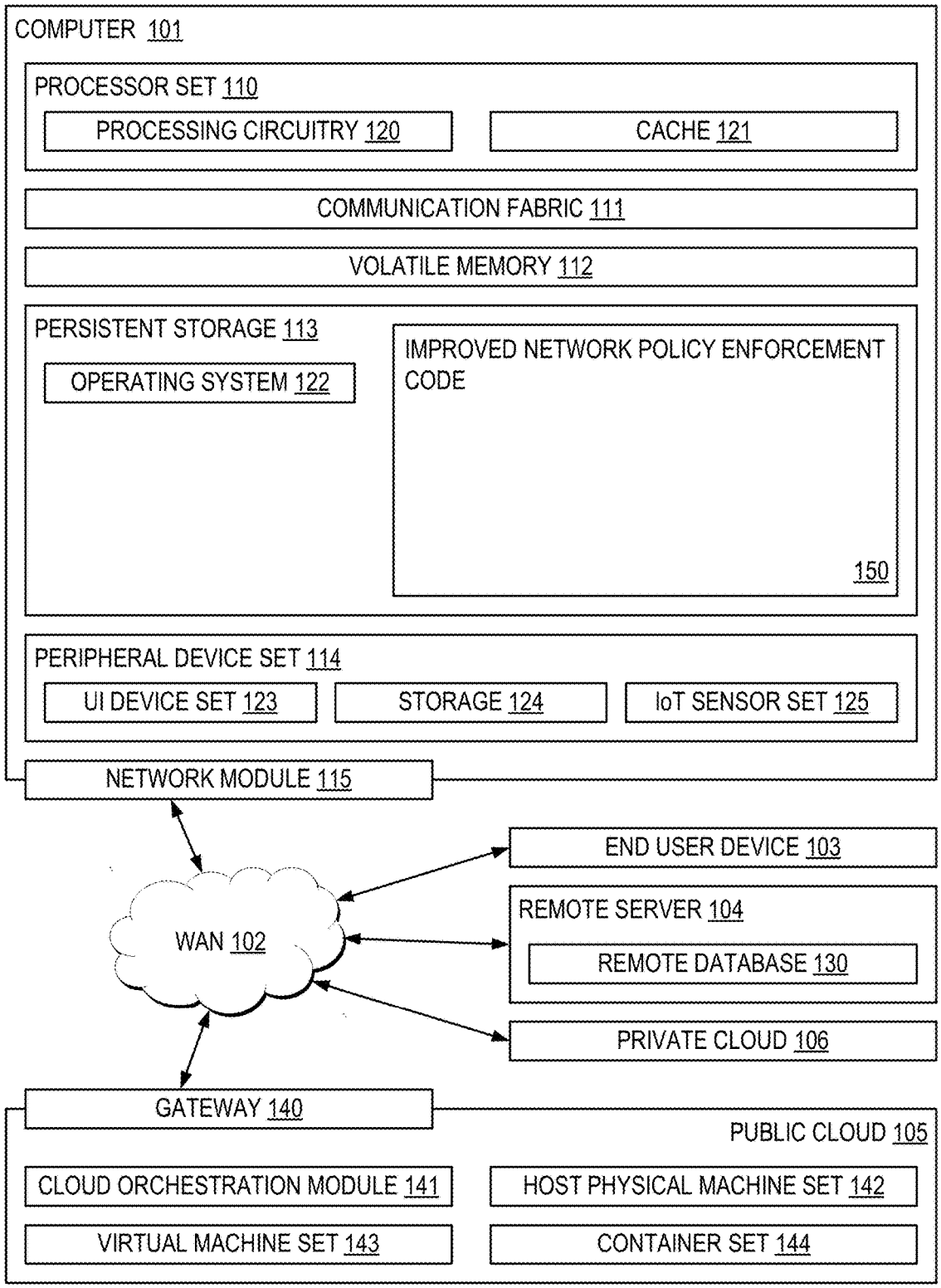
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for generating and using surrogate pods to enforce network policies across cluster boundaries. Implementations herein are thereby able to achieve tailored performance across cluster boundaries. For instance, specific policies may be enforced at each cluster by creating and managing surrogate pods, which effectively act as data and contextual relays that provide insight as to how each request that is received should be processed. As a result, approaches herein are able to satisfy received requests with significantly more granularity and efficiency than has conventionally been achievable, e.g., as will be described in further detail below.

In one general approach, a computer-implemented method includes: receiving a tunnel request at a service cluster from a client at a remote cluster. In some instances, the tunnel request is received at the service cluster from a surrogate pod at the remote cluster, the surrogate pod being correlated with the client. The received tunnel request further includes metadata associated with the client at the remote cluster. The computer-implemented method further includes using the metadata to establish a surrogate pod at the service cluster that replicates the client at the remote cluster. A tunnel identifier corresponding to the established surrogate pod is returned to the remote cluster. Moreover, in response to receiving a service request that includes the tunnel identifier, the service request is directed to the surrogate pod.

It follows that various approaches herein are able to achieve tailored performance across cluster boundaries, which has conventionally been unachievable. For instance, approaches are able to enforce specific policies at each cluster by creating and managing surrogate pods in the clusters. These surrogate pods thereby effectively act as data and contextual relays that provide insight as to how each request that is received should be processed. This insight is achieved, at least in part, by utilizing metadata associated with each client that issues a request. As a result, approaches herein are able to satisfy received requests with significantly more granularity and efficiency than has conventionally been achievable.

In some implementations, using metadata to establish a surrogate pod at the service cluster that replicates the client at the remote cluster can include: applying one or more workload-based policies and/or location-based policies to the surrogate pod such that the surrogate pod is configured to modify service requests before causing the modified service requests to be satisfied. The one or more workload-based policies and/or location-based policies correspond to the client at the remote cluster. The one or more workload-based policies and/or location-based policies may be applied to a newly formed surrogate pod in some instances. In other instances, the one or more workload-based policies and/or location-based policies may be applied to an existing surrogate pod in the remote cluster.

The workload-based policies and/or location-based policies that are applied to each surrogate pod include information which allow for received requests to be processed as desired despite being sent across cluster boundaries. The surrogate pods are thereby each able to enforce specific policies at each cluster. Again, these surrogate pods effectively act as data and contextual relays that provide insight as to how each request that is received should be processed. Approaches herein are thereby able to satisfy received requests with significantly more granularity and efficiency than has conventionally been achievable.

In some implementations, using metadata to establish a surrogate pod at the service cluster that replicates the client at the remote cluster can include: applying one or more workload-based policies and/or location-based policies to the surrogate pod such that the surrogate pod is configured to modify service requests before causing the modified service requests to be satisfied. The one or more workload-based policies and/or location-based policies correspond to the client at the remote cluster. In some approaches, one or more workload-based policies and/or location-based policies may include data encryption. The surrogate pod may thereby be configured to encrypt and decrypt data in such approaches. In other approaches the one or more workload-based policies and/or location-based policies include data compression. The surrogate pod may thereby be configured to compress and decompress data in such approaches.

It follows that in some approaches, surrogate pods may be configured to perform supplemental functionality. Thus, in addition to enforce specific policies at each cluster, the surrogate pods are able to improve other performance characteristics. For instance, in some approaches surrogate pods increase data storage capacity and throughput by performing data compression and decompression. In other approaches, surrogate pods increase data security (e.g., retention) by performing data encryption and decryption, data hardening, etc. As a result, approaches herein are able to satisfy received requests with significantly more granularity and efficiency than has conventionally been achievable.

In some implementations, one or more surrogate pods are logical components. Thus, any of the surrogate pods located at the remote client clusters or the central cluster may be virtual pods. Virtual pods can desirably be used to reduce resource usage. The process of establishing (e.g., forming) a correlated pair of surrogate pods may thereby involve logically assigning virtual pods, e.g., as would be appreciated by one skilled in the art after reading the present description.

In other implementations, one or more surrogate pods are physical components. Thus, any of the surrogate pods located at the remote client clusters or the central cluster may be physical pods that can be accessed by following a prespecified route and/or applying a redirection mechanism. It follows that in some situations, functionality may be implemented at the networking level of the nodes rather than actually implementing pods.

In some implementations, the computer-implemented method includes monitoring services that are offered by the service cluster. Based at least in part on the monitoring, a summary of the services that are offered by the service cluster is output to the remote cluster. It follows that in some approaches, a received service request may correspond to a first service offered by the service cluster.

Monitoring services that are offered by a service cluster desirably provides an updated overview of the services that are available. This avoids decreased throughput resulting from requests that are issued for services that are currently not offered. Clients are also made aware of newly offered services, thereby improving performance of the system as a whole.

A computer program product, according to yet another approach, includes a computer readable storage medium having program instructions embodied therewith. The program instructions are readable by a processor, executable by the processor, or readable and executable by the processor, to cause the processor to: perform any combination of the foregoing methodology. It follows that computer program products are able to achieve the improvements described above by performing the foregoing method.

A system, according to yet another approach, includes: a processor, as well as logic that is integrated with the processor, executable by the processor, or integrated with and executable by the processor. Moreover, the logic is configured to: perform any combination of the foregoing methodology. It follows that systems are able to achieve the improvements described above by performing the foregoing method.

A particular application of an approach can be using the computer-implemented method as described above to enforce specific policies at a remote cluster depending on which client the requests are received from. For instance, a request received from a first client is directed to a specific surrogate pod, providing insight as to how that request should be satisfied. Alternatively, a request received from a second client may be directed to a different surrogate pod which provides different insight as to how the request received from the second client should be satisfied. It follows that correlated pairs of surrogate pods desirably represent external and remote entities in local semantics, e.g., by providing local labels and local addresses. As a result, approaches herein are able to satisfy received requests with significantly more granularity and efficiency than has conventionally been achievable. Additionally, each domain (e.g., cluster) may be managed independently, such that there is no assumption of common end-to-end mechanisms and/or single cross-domain ownership, e.g., as would be appreciated by one skilled in the art after reading the present description. These improvements are particularly desirable as the multi-cloud and multi-cluster workloads become more prevalent.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product implementation ("CPP implementation" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved network policy enforcement code at block 150 for generating and using surrogate pods to enforce network policies (e.g., Kubernetes network policies) across cluster boundaries. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As noted above, distributed systems have been developed to increase the availability and scalability of compute based services to clients. For instance, a number of nodes that are spread across a distributed system may be combined logically into a common cluster of nodes. Each of the nodes may represent a virtual or physical machine, thereby providing distributed compute power that may be used in parallel to process requests that are received from clients. A node may provide this processing throughput by managing a number of pods, where each of the pods further include one or more containers. These pod containers may be used to host the code and dependencies that are associated with running an application. In other words, the cluster of nodes are able to run containerized applications. These distributed systems thereby serve as container orchestration platforms.

According to an example, which is in no way intended to be limiting, a Kubernetes cluster may be used as a container orchestration platform having nodes that run containerized applications. A containerized application package includes the application along with the associated dependences and/or services. Thus, container orchestration platforms provide a more lightweight and flexible solution to satisfying throughput experienced during use, than a distributed system which simply implements a number of virtual machines. In this way, container orchestration platforms like Kubernetes clusters allow for applications to be more easily developed and managed.

Although container orchestration platforms are able to increase the availability and scalability of compute based services, e.g., as described above, conventional platforms have suffered from limited transparency between the different clusters therein. For instance, conventional platforms have been unable to pass any contextual information across cluster boundaries. Thus, service requests that are received at a cluster in conventional platforms do not include any information about the pod(s) that originally issued the service request. In other words, there is no context associated with the flow of service requests between clusters in these conventional platforms. As a result, conventional platforms have been unable to implement access policies and/or access controls that influence how services are rendered in response to receiving cross-cluster requests.

In sharp contrast to these conventional shortcomings, approaches herein are able to achieve tailored performance across cluster boundaries. For instance, approaches are able to enforce specific policies at each cluster by creating and managing surrogate pods in the clusters. These surrogate pods thereby effectively act as data and contextual relays that provide insight as to how each request that is received should be processed. In some approaches, surrogate pods may further be configured to perform supplemental functionality, e.g., such as data compression/decompression, data encryption/decryption, data anonymizing/retagging, etc. As a result, approaches herein are able to satisfy received requests with significantly more granularity and efficiency than has conventionally been achievable, e.g., as will be described in further detail below.

Figure 2A:
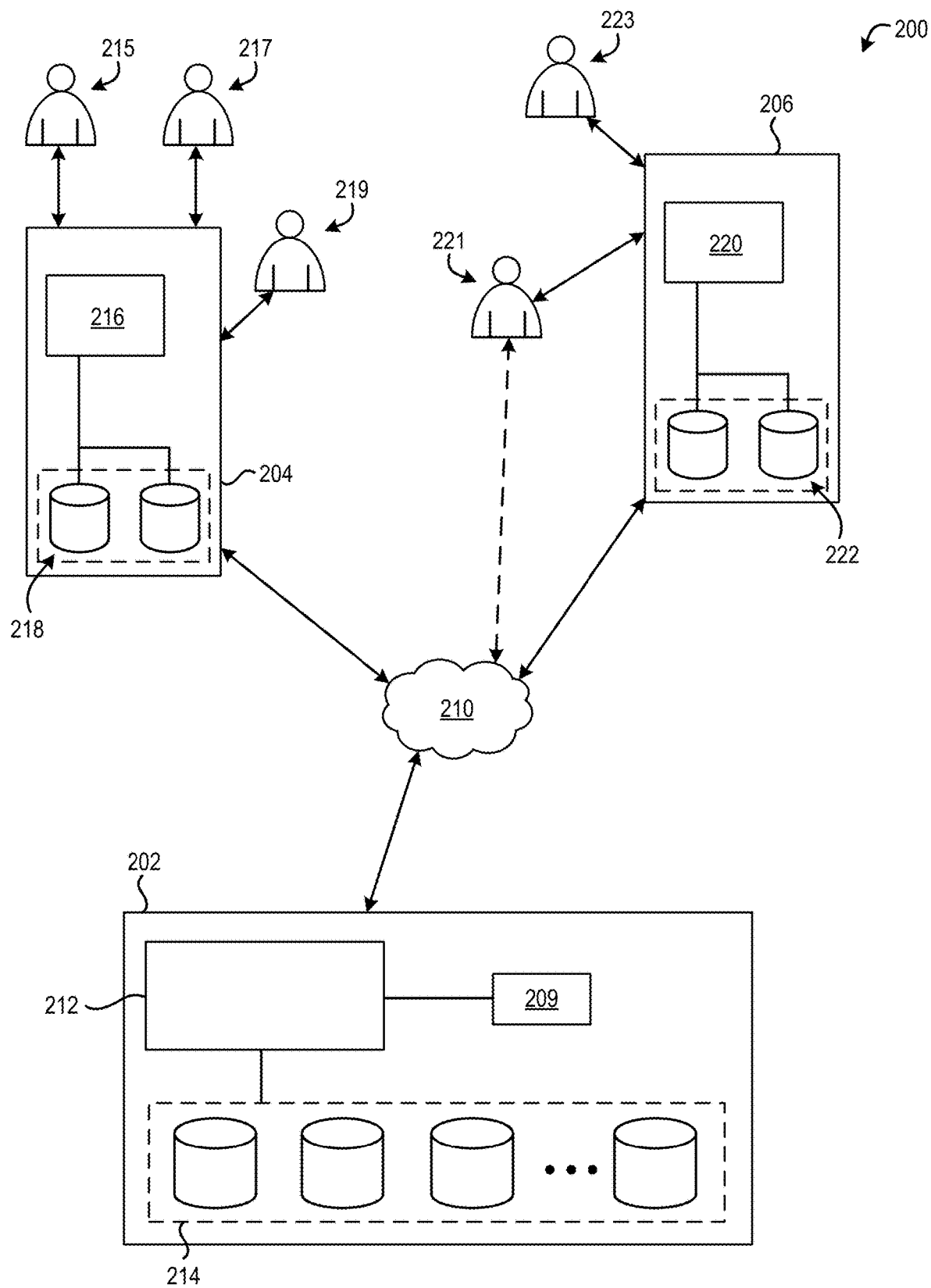
FIG. 2A is a representational view of the components in a distributed system, in accordance with one approach.
Figure 2B:
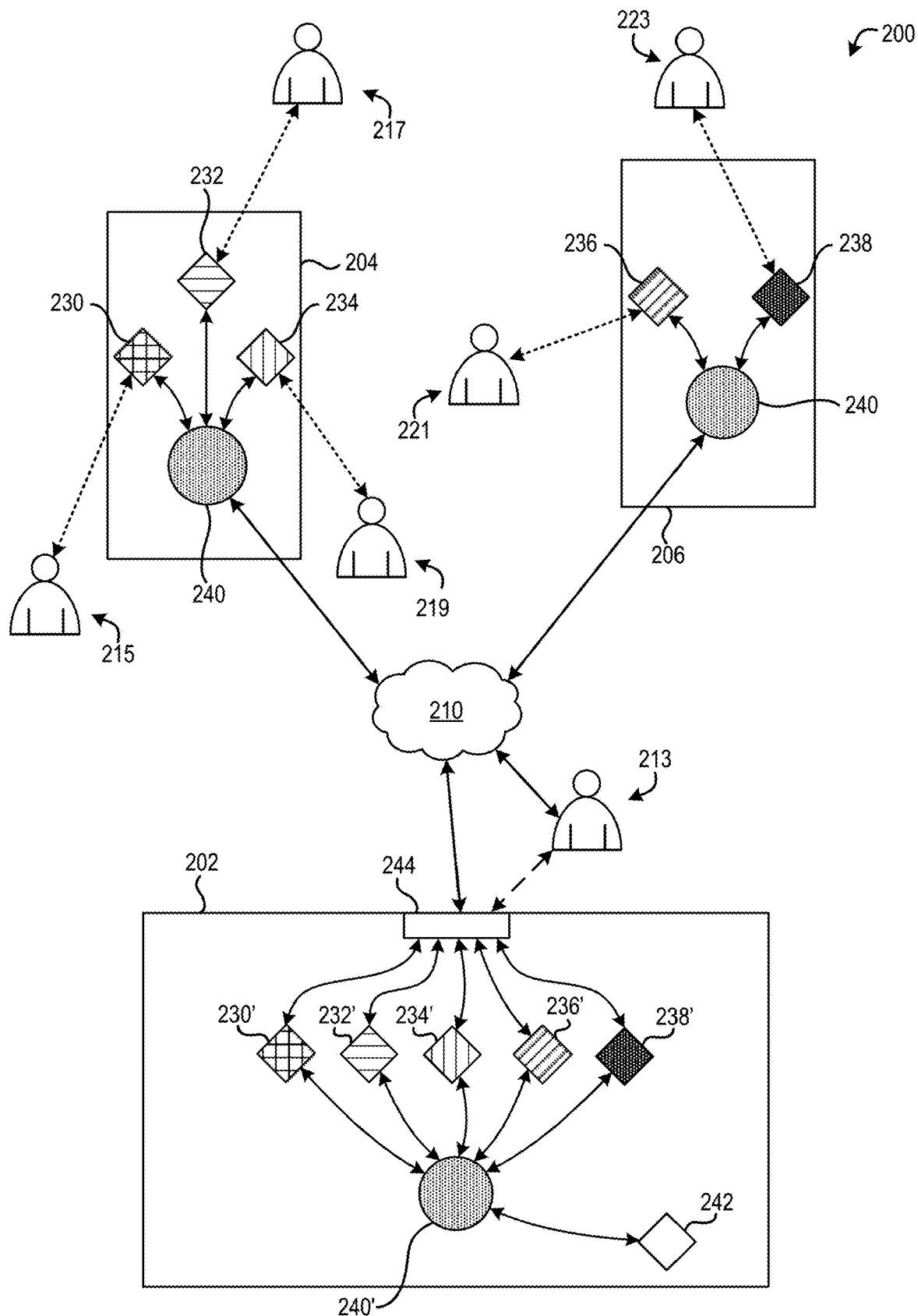
FIG. 2B is a representational view of the logical entities maintained by the components in FIG. 2A, in accordance with one approach.

Looking now to FIGS. 2A-2B, representational views of a distributed system 200 that is configured as a container orchestration platform are shown in accordance with one approach. Specifically, FIG. 2A provides a representational view of the physical components that are included in the distributed system 200 in accordance with one approach, while FIG. 2B provides a representational view of the logical entities that may be maintained by the physical components in FIG. 2A in accordance with one approach.

As an option, the present system 200 may be implemented in conjunction with features from any other approach listed herein, such as those described with reference to the other FIGS. However, this system 200 and others presented herein may be used in various applications and/or in permutations which may or may not be specifically described in the illustrative approaches or implementations listed herein. Further, the system 200 presented herein may be used in any desired environment. Thus FIGS. 2A-2B (and the other FIGS.) may be deemed to include any possible permutation.

Looking first to FIG. 2A, the system 200 is shown as having a number of physical components therein. For instance, the system 200 is illustrated as including a central cluster 202 that is connected to a first cluster 204 and a second cluster 206. Specifically, the central cluster 202, first cluster 204, and second cluster 206 are each connected to a network 210. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc., may be sent between the clusters 204, 206, and/or 202, regardless of the amount of separation which exists therebetween, e.g., despite being positioned at different geographical locations.

It should also be noted that two or more of the clusters 204, 206, 202 may be connected to each other differently depending on the approach. According to an example, which is in no way intended to limit the invention, two or more edge clusters (e.g., compute nodes) may be located relatively close to each other and connected by a wired connection, e.g., a cable, a fiber-optic link, a wire, etc., or any other type of connection which would be apparent to one skilled in the art after reading the present description.

With continued reference to FIG. 2A, the first and second clusters 204, 206 may have a different configuration than the central cluster 202. For instance, the first cluster 204 includes a processor 216 coupled to memory 218, and second cluster 206 includes a processor 220 coupled to memory 222. The memory implemented at each of the clusters 204, 206 may be used to store a variety of data and information received. Accordingly, the clusters 204, 206 may store at least some information associated with clients 215, 217 and/or the corresponding clusters 204, 206 themselves.

It should also be noted that the term "client" as used herein may include one or more pieces of computer hardware or software at a remote client cluster that access a service made available by the service cluster over a network. Thus, in some approaches, a "client" is a computer or a program that sends a request to another program, computer hardware, computer software, etc., in order to access a service made available by the service cluster. It follows that the client may serve as a representation for an individual user, a corporation, another running application, etc., depending on the given approach.

Referring still to FIG. 2A, the central cluster 202 includes a large (e.g., robust) processor 212 that is coupled to a cache 209 and a data storage array 214 having a relatively high storage capacity (e.g., at least a higher storage capacity than the cache 209). The central cluster 202 is thereby able to process and store a relatively large amount of data, allowing it to be connected to, and manage, multiple different remote clusters (e.g., edge node servers). The central cluster 202 may thereby be configured to provide one or more remote clusters access to different services. As used herein, a "service" is intended to refer to a logical abstraction for a deployed group of pods in a cluster, where each of the pods in the group perform the same function, e.g., as described in further detail below with respect to FIG. 2B.

Again, the central cluster 202 may receive data, client and/or user information for authentication challenges, commands, etc., from any number of locations. For instance, the central cluster 202 may receive service requests from clients at remote clusters. While conventional platforms have been unable to differentiate details associated with the source of a received request, approaches herein are desirably able to successfully pass contextual information across cluster boundaries. This allows for each service request (and other types of requests) received at the central cluster 202 to be processed based on where the respective request originates from. Additionally, the context may be added without any changes being made by the client. For example, a client may provide contextual information in a submitted service request using HTTP headers. It follows that the source of a service request may be used to modify how the service request is actually processed. This allows for different location-based policies to impact how service requests received from different locations (e.g., clients at remote clusters) are processed. In other words, location-based policies may be applied regardless of the current workload experienced.

Workload-based policies may also be used to modify how received service requests are satisfied. Some approaches involve using the throughput of the system to determine how and/or if certain service requests should be processed. For instance, received service requests may be at least temporarily delayed during periods of high throughput. Moreover, service requests may be performed as they are received (along with any delayed service requests) during periods of low throughput. This desirably avoids experiencing increased latency during periods of high throughput by selectively performing service requests at times of low activity. In other words, workload-based policies may be domain-independent and are applied regardless of where the request is received from. A nonlimiting list of illustrative domain-independent policies may involve firewalling, transcoding, anonymizing, etc.

These workload-based and/or location-based policies that impact how service requests are processed may be programmed into surrogate pods that are established at the different clusters. In other words, each of the surrogate pods at a given cluster may be programmed to implement a unique set of policies that ensure service requests are performed at the given cluster in a particular manner. Looking now to the representational view of FIG. 2B, a number of surrogate pods are shown as having been established at each of the clusters 202, 204, 206. As noted above, these surrogate pods are used to enforce network access policies (e.g., Kubernetes network policies) across different distributed clusters, e.g., as will soon become apparent.

The first and second clusters 204, 206 include client side surrogate pods (CSSPs) 230, 232, 234, 236, 238. Each of these CSSPs 230, 232, 234, 236, 238 correspond to a respective client 215, 217, 219, 221, 223 that is connected to the appropriate cluster (e.g., as represented by dashed lines extending therebetween). The CSSPs thereby serve as access points for each of the respective clients that are connected to clusters 204, 206. The CSSPs 230, 232, 234, 236, 238 also direct requests received from the respective clients to a service surrogate pod 240. The service surrogate pod 240 may serve as a logical extension of a service that is offered by the central cluster 202, allowing clients to submit what appear to be local service requests.

From the service surrogate pods 240 at remote clusters 204, 206, service requests are sent to the central cluster 202 over network 210. These service requests are further received at a point of ingress 244 in the central cluster 202. The point of ingress 244 may work in concert with a controller at the central cluster 202 to examine each received request and identify a tunnel identifier appended thereto. The tunnel identifier is used to identify the CSSP at one of the remote clusters 204, 206 that issued the service request, as well as the correlated surrogate pod at the central cluster 202 that the service request should be directed to. In other words, the point of ingress 244 may work with the controller (e.g., see processor 212 in FIG. 2A) to act as a sorting module that directs each of the incoming service requests to the appropriate service side surrogate pods (SSSPs) 230', 232', 234', 236', 238' located at the central cluster 202 for processing.

According to an example, which is in no way intended to be limiting, client 217 issues a service request that is received at CSSP 232. The service request is further sent from CSSP 232 to surrogate pod 240, which in turn directs the service request to the appropriate SSSP 232'. It follows that each CSSP is correlated with a respective one of the SSSPs such that clients are represented as an entity in one of the remote clusters 204, 206, as well as an entity at the central cluster 202. This desirably allows for contextual information to be shared across cluster boundaries, which has been conventionally unachievable.

In some approaches, each of the CSSPs and/or SSSPs may be logical components. In other words, any of the surrogate pods located at the remote client clusters or the central cluster may be virtual pods. Virtual pods can be used to reduce resource usage in both the CSSPs and the SSSPs. In some approaches, routing may further be used to simplify and extend redirection of traffic in both clusters. According to an example, which is in no way intended to be limiting, approaches implementing Kubernetes container orchestration platforms may use virtual Kubelets to form CSSPs and/or SSSPs. The process of establishing (e.g., forming) a correlated CSSP and SSSP pair may thereby involve logically assigning virtual pods, e.g., as would be appreciated by one skilled in the art after reading the present description.

In other approaches the CSSPs and/or SSSPs may be physical components. In other words, any of the surrogate pods located at the remote client clusters or the central cluster may be physical pods that can be accessed by following a prespecified route and/or applying a redirection mechanism. In some approaches the redirection mechanism may be applied using Kubernetes container network interface (CNI), Extended Berkeley Packet Filter (eBPF), etc. It follows that functionality may be implemented at the networking level of the nodes rather than actually implementing pods.

With continued reference to FIG. 2B, each of the SSSPs are preferably configured to process service requests according to one or more policies that are correlated with the client that originated the service request. In other words, each of the SSSPs are able to adjust how the received service request is satisfied based on where the request is received from. It follows that the process of establishing a correlated CSSP and SSSP pair includes applying one or more policies to the pair of surrogate pods such that the service requests are modified according to the policies before being performed. With respect to the present description, a "policy" may include any predetermined set of guidelines (e.g., steps) that are followed if specific conditions are met. For instance, one or more workload-based policies that cause service requests to be modified based on current throughput levels may be implemented in a CSSP and SSSP correlated pair. It follows that workload-based policies may be applied dynamically based on real-time feedback. One or more location-based policies that cause service requests to be modified based on where the requests are received from may be implemented in a CSSP and SSSP correlated pair.

The number and type of policies that are assigned to a client may be based on a number of factors, e.g., such as a level of data security desired by the client, a relative amount of throughput associated with a received request, a current amount of compute overhead, current memory capacity levels, a relative importance of the service request itself, etc.

Surrogate pods may also be configured to perform supplemental functionality in some approaches. For instance, one or more of the CSSPs and/or SSSPs may be configured to perform data compression/decompression, data encryption/decryption, data hardening, etc. As a result, approaches herein are able to satisfy received requests with significantly more granularity and efficiency than has conventionally been achievable.

It follows that the central node 202 is able to automatically deduce information associated with a service request based at least in part on the correlated CSSP and client that originally issued the service request. For example, SSSP 232' is correlated with CSSP 232 and client 217, allowing for requests received at SSSP 232' to be automatically modified according to any location-based policies that may be associated with client 217. However, it should be noted that correlation may only be implemented if it is beneficial to the application of policies. According to an example, which is in no way intended to be limiting, in approaches that implement policies which treat all clients from a specific location the same way, only one such SSSP may be applied to all CSSPs and clients from that location.

Similarly, SSSP 232' may be configured to apply workload-based policies that impact received requests based on current workloads. For instance, SSSP 232' may not allow received requests to be processed during periods of high throughput. It follows that the surrogate pods may serve as policy enforcement points for cross-domain traffic by acting as content specific gateways between the different clusters (e.g., domains). In other words, approaches herein are able to conserve compute resources while maintaining logical surrogate pod objects.

From SSSP 232', the potentially modified service request is sent to service 240' which uses additional compute components 242 to satisfy it. The surrogate pods 240 may thereby serve as local logical access points for a service 240' that is offered at the central cluster 202. It should be noted that the service 240' communicating with the SSSPs at the central cluster 202 is a logical entity. Thus, in some approaches the logical service 240' entity may not include any physical compute resources that perform the service in response to being called. Rather, the service 240' further directs the service requests to an implementation having the additional compute components 242.

It follows that approaches described herein are able to overcome conventional shortcomings by successfully passing contextual information across cluster boundaries. This allows for different access policies and/or access controls to be implemented at each of the clusters based on when a request is received and where the request is received from. In other words, the source of a service request may be used to determine how the service request should actually be processed.

Figure 3A:
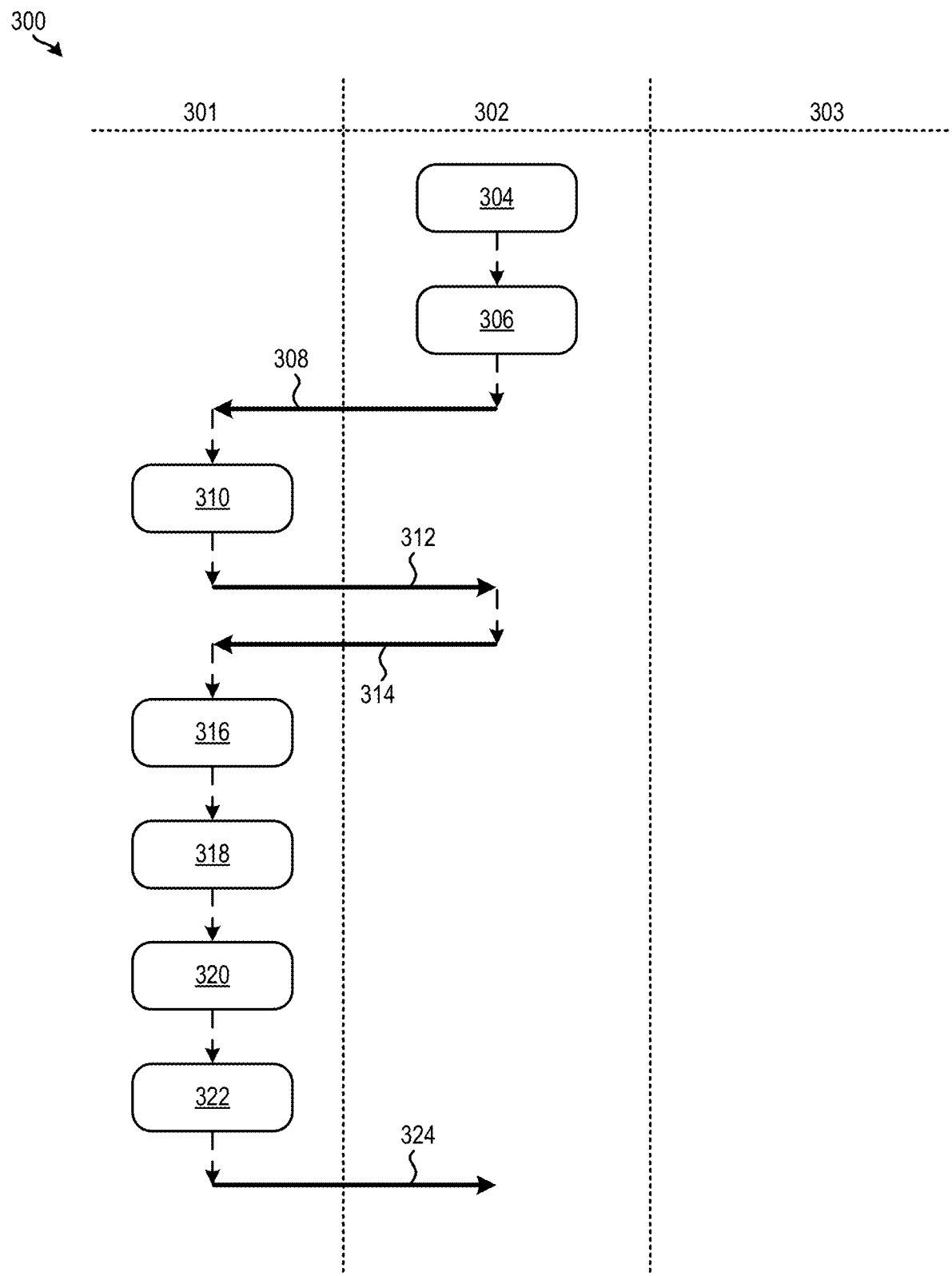
FIG. 3A is a flowchart of a method, in accordance with one approach.

Referring now to FIG. 3A, a computer-implemented method 300 for generating and using surrogate pods to enforce network policies (e.g., Kubernetes network policies) across cluster boundaries is illustrated in accordance with one approach. This desirably avoids situations where contextual information associated with requests is lost. The method 300 may be performed in accordance with the present invention in any of the environments depicted in FIGS. 1-2B, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment. For example, each of the nodes 301, 302, 303 shown in the flowchart of method 300 may correspond to one or more processors, controllers, computers, etc., positioned at a different cluster of a distributed system (e.g., as seen in FIG. 2A).

For instance, nodes 302 and 303 may each include one or more processors at client locations of a distributed system (e.g., see remote clusters 204, 206 of FIGS. 2A-2B above). Furthermore, node 301 may include one or more processors which are located at a central server configured to manage a distributed system (e.g., see central cluster 202 of FIGS. 2A-2B above). It follows that commands, data, requests, etc. may be sent between each of the nodes 301, 302, 303 depending on the approach. Moreover, it should be noted that the various processes included in method 300 are in no way intended to be limiting, e.g., as would be appreciated by one skilled in the art after reading the present description. For instance, data sent from node 302 to node 303 may be prefaced by a request sent from node 303 to node 302 in some approaches.

In various implementations, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Looking specifically now to the flowchart, a client may wish to access a service that is available (e.g., offered). For instance, a client may use an application programming interface (API), e.g., such as Multi Cluster Services KEP, to gain access to service clusters offering service, to use explicit imports. Accordingly, operation 304 includes connecting to a surrogate pod at node 302 which corresponds to the available service. In some approaches, the surrogate pod may not yet be formed at node 302. Thus, operation 304 may initially include forming a surrogate pod in the local cluster that represents the client that initiated the connection. As indicated above, surrogate pods that are formed at a client cluster are referred to herein as CSSPs. Each CSSP preferably includes labels that match a corresponding surrogate pod located at the service cluster. For example, a CSSP may include labels that indicate the address of a control plane at the service cluster, as well as the corresponding SSSP there.

In response to connecting to the local CSSP, operation 306 further includes gathering metadata associated with the client that initiated the connection. In other words, information that conveys details of the client, e.g., such as labels, namespaces, service account information, details associated with an image being run, etc., is collected and incorporated into the CSSP. In some approaches, the metadata may be collected directly from the client itself by issuing one or more prompts instructing the client to provide the desired metadata. In other approaches, the desired metadata may be prestored in a lookup table for easy access, decreasing the amount of time associated with connecting to a given CSSP. For example, the Internet protocol (IP) address assigned to the client submitting the request may be used to retrieve the desired metadata from the orchestration system control plane, e.g., such as labels, namespace information, images, etc.

Proceeding to operation 308, a control message is sent from a controller at node 302 to a controller (e.g., server side control plane) at node 301. The control message includes a tunnel request to the available service. In other words, the control message requests access to the service that has been made available to the requesting client. The control message also provides the metadata gathered in operation 306 from the client pod that originally connected to the CSSP at node 302. Accordingly, operation 308 may include sending a control message to the control plane at the service cluster requesting access to a desired service, while also providing client information, e.g., such as pod metadata, the name of the desired service, IP address, etc.

Looking now to node 301, the flowchart advances to operation 310 in response to receiving the control message and tunnel request from the remote cluster at node 302. There, operation 310 includes using the metadata to establish a surrogate pod at the service cluster that replicates at least some details associated with the client at the remote cluster. However, it should be noted that the metadata can be modified to match expectations and/or constraints (e.g., add source-cluster label, remove specific label, change the value of a specific label, etc.) that are implemented at the service cluster. With respect to the present description, a surrogate pod may be "established" differently depending on the particular approach. In some approaches, a new surrogate pod is "established" at service cluster by actively creating a new pod. Moreover, a new logical surrogate pod may be established (e.g., created) using one or more commands that are issued by a controller at the service cluster. However, a new physical surrogate pod may be established by adding a physical component to the service cluster that can be accessed by following a prespecified route and/or applying a redirection mechanism. For instance, the redirection mechanism may be applied using Kubernetes container network interface (CNI), Extended Berkeley Packet Filter (eBPF), etc. In other approaches, a surrogate pod may be "established" by repurposing an existing surrogate pod that may no longer be in use. For instance, any policies originally assigned to the existing surrogate pod may be removed and replaced with updated policies that pertain to the current situation. However, in some situations, the existing surrogate pod may already have one or more desired policies implemented, thereby reducing the amount of preprocessing involved with preparing the surrogate pod to satisfy received service requests.

It follows that each surrogate pod that is established at the service cluster may be a SSSP that is correlated with a respective CSSP at a remote cluster. As noted above, this allows approaches herein to enforce specific policies at each cluster by maintaining contextual relevance across cluster boundaries. These surrogate pod pairs thereby effectively act as data relays that provide insight as to how each request should be processed.

In some approaches, surrogate pods may further be configured to perform supplemental functionality, e.g., such as data compression/decompression, data encryption/decryption, etc. As a result, approaches herein are able to satisfy received service requests with significantly more granularity and efficiency than has conventionally been achievable, e.g., as will be described in further detail below.

Proceeding now to operation 312, a tunnel identifier corresponding to the SSSP formed at node 301 is returned to the remote client cluster at node 302. The tunnel identifier provides information associated with the established SSSP, e.g., including how to direct service requests to the SSSP at node 301. This allows the CSSP of the remote client cluster at node 302 to direct subsequent service requests (e.g., access requests) to the appropriate SSSP of the central cluster at node 301. Accordingly, the tunnel identifier may be integrated with the corresponding CSSP at node 302, stored in a lookup table, appended to existing information managed by a controller at node 302, etc., such that it is easily accessible. The tunnel identifier may thereby be used to establish a connection between the SSSP formed at node 301 and the remote client cluster at node 302. Depending on the approach, this connection may be formed and/or maintained using HTTP CONNECT, Quick UDP Internet Connections (QUIC) streams, server name indication (SNI), etc., or other certificate metadata, e.g., as would be appreciated by one skilled in the art after reading the present description. According to an example, which is in no way intended to be limiting, returning the tunnel identifier involves exchanging resources between SSSP at node 301 and node 302 using HTTP CONNECT. This initiates two-way communications which can be used to open a tunnel therebetween. According to another example, which again is in no way intended to be limiting, the tunnel identifier returned to remote client cluster at node 302 includes a SNI which enables a client device at node 302 to specify the domain name associated with the SSSP at node 301 in the first step of a Transport Layer Security (TLS) handshake.

It follows that one or more service requests may be issued from node 302 to node 301 at any desired time after correlating the CSSP at node 302 with the SSSP at node 301. Thus, proceeding to operation 314, a service request is shown as being sent from node 302 back to node 301 along the established path between the CSSP and SSSP, as described above. While only one service request is shown as being issued from a CSSP at node 302 to a corresponding SSSP at node 301, this is in no way intended to be limiting. As alluded to above, cluster locations may send any desired number of service requests to a central service cluster. The central service cluster may also offer multiple different services to customers at remote locations. Thus, clients with access to remote clusters at node 302 and/or 303 may send any desired number of service requests to the central cluster at node 301 after establishing a corresponding pair of surrogate pods, e.g., as described above.

In response to receiving the service request and tunnel identifier, operation 316 includes causing the service request to be directed to the SSSP that is correlated with the CSSP at node 302 which issued the service request. In other words, operation 316 includes making sure the service request is examined by the appropriate SSSP at node 301. Again, each SSSP at node 301 is configured to modify a service request according to one or more preprogrammed policies before causing (e.g., allowing) the modified service request to be satisfied. Ensuring a service request is delivered to the appropriate SSSP at node 301 thereby desirably ensures the service request will be processed in a manner that is consistent with the source of the received request. Again, this is achieved by successfully exchanging contextual information across cluster boundaries as a result of the correlated surrogate pod pairs, which has not been conventionally achievable.

From operation 316, method 300 proceeds to operation 318. There, operation 318 includes causing the received service request to be modified according to the policies preprogrammed into the respective SSSP. Operation 320 further includes directing the modified service request to the offered service, while operation 322 includes pushing the modified service request to additional compute components that are used to satisfy the request. In some approaches, a message is returned to the requesting cluster indicating that the request has been successfully processed. See operation 324. The return message may include information associated with satisfying the service request, confirmation codes, specific information associated with the policies used to modify the request, etc.

It follows that method 300 is able to achieve tailored performance across cluster boundaries. As noted above, approaches herein are able to enforce specific policies at each cluster by creating and managing surrogate pods which effectively act as data relays, providing insight as to how each service request should be processed. These correlated pairs of surrogate pods desirably represent external and remote entities in local semantics, e.g., by providing local labels and local addresses. As a result, approaches herein are able to satisfy received requests with significantly more granularity and efficiency than has conventionally been achievable. Additionally, each domain (e.g., cluster) may be managed independently, such that there is no assumption of common end-to-end mechanisms and/or single cross-domain ownership, e.g., as would be appreciated by one skilled in the art after reading the present description. These improvements are particularly desirable as the multi-cloud and multi-cluster workloads become more prevalent.

It should also be noted that although node 303 is not specifically shown as sending any service requests to service cluster at node 301, any one or more of the operations described above may be used to facilitate service requests that are received from node 303, or any other node that is connected thereto (e.g., over a network).

Figure 3B:
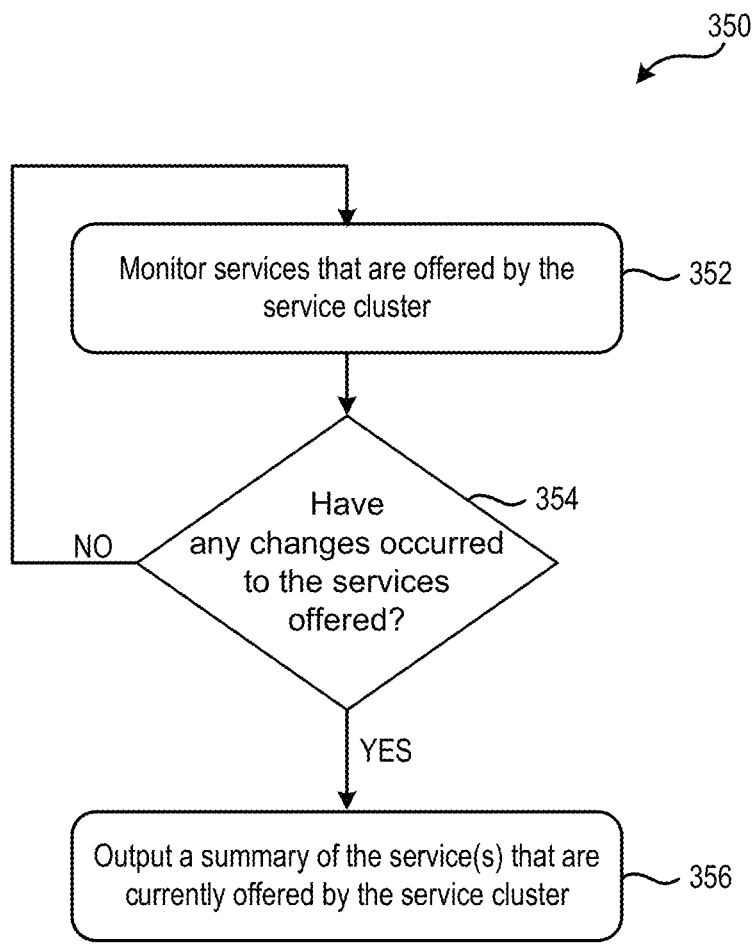
FIG. 3B is a flowchart of a method, in accordance with one approach.

The services that are offered by a central cluster change over time. Accordingly, it is desirable that a service cluster continually monitors the services that are available and provide insight to customers at remote clusters. For instance, FIG. 3B illustrates a flowchart of a computer-implemented method 350 according to one approach. The method 350 may be performed in accordance with any of the environments depicted in FIGS. 1-3A, among others. For example, method 350 may be performed in the background to continually monitor offered services without otherwise impacting real-time performance. Of course, more or less operations than those specifically described in FIG. 3B may be included in method 350, as would be understood by one of skill in the art upon reading the present descriptions.

Each of the steps of the method 350 may be performed by any suitable component of the operating environment using known techniques and/or techniques that would become readily apparent to one skilled in the art upon reading the present disclosure. For example, in various approaches, the method 350 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 350. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3B, operation 352 of method 350 includes monitoring services that are offered by the service cluster. Services offered by the service cluster may be monitored in some approaches by continually inspecting each of the services that are offered, and identifying any changes. However, the services may be inspected periodically, in response to a predetermined condition being met, in response to receiving a service request from a client, etc. In other approaches, a service cluster may issue a notification which indicates that a new service has been added and/or a previously offered service has been removed. Operation 352 may thereby continually check for any such notifications, which reduces the amount of compute overhead associated with continually monitoring the services that are offered.

In response to monitoring the offered services, operation 354 includes determining whether any changes have occurred to the services that are offered. In other words, operation 354 includes determining whether any new services have been added and/or existing services have been removed. In response to determining that no changes to the services have been made, method 350 is shown as returning to operation 352 such that monitoring may continue.

However, method 350 proceeds to operation 356 in response to determining that changes have been made to the services that are offered. There, operation 356 includes outputting a summary of the service(s) that are currently offered by the service cluster. In preferred approaches, the summary of offered services is output to each remote client cluster that is connected to (e.g., in communication with) the service cluster. Accordingly, each of the client clusters has an updated list of offered services to choose from. However, in other approaches the summary of services may be output to a predetermined memory location (e.g., lookup table) that may be accessed by any of the remote client clusters to determine the services that are currently available.

It should also be noted that software for performing the methodology of FIGS. 3A-3B may be deployed to a computer that is used to perform the various operations of the method via any known technique(s). An exemplary process for such deployment is presented immediately below with respect to FIG. 4.

Figure 4:
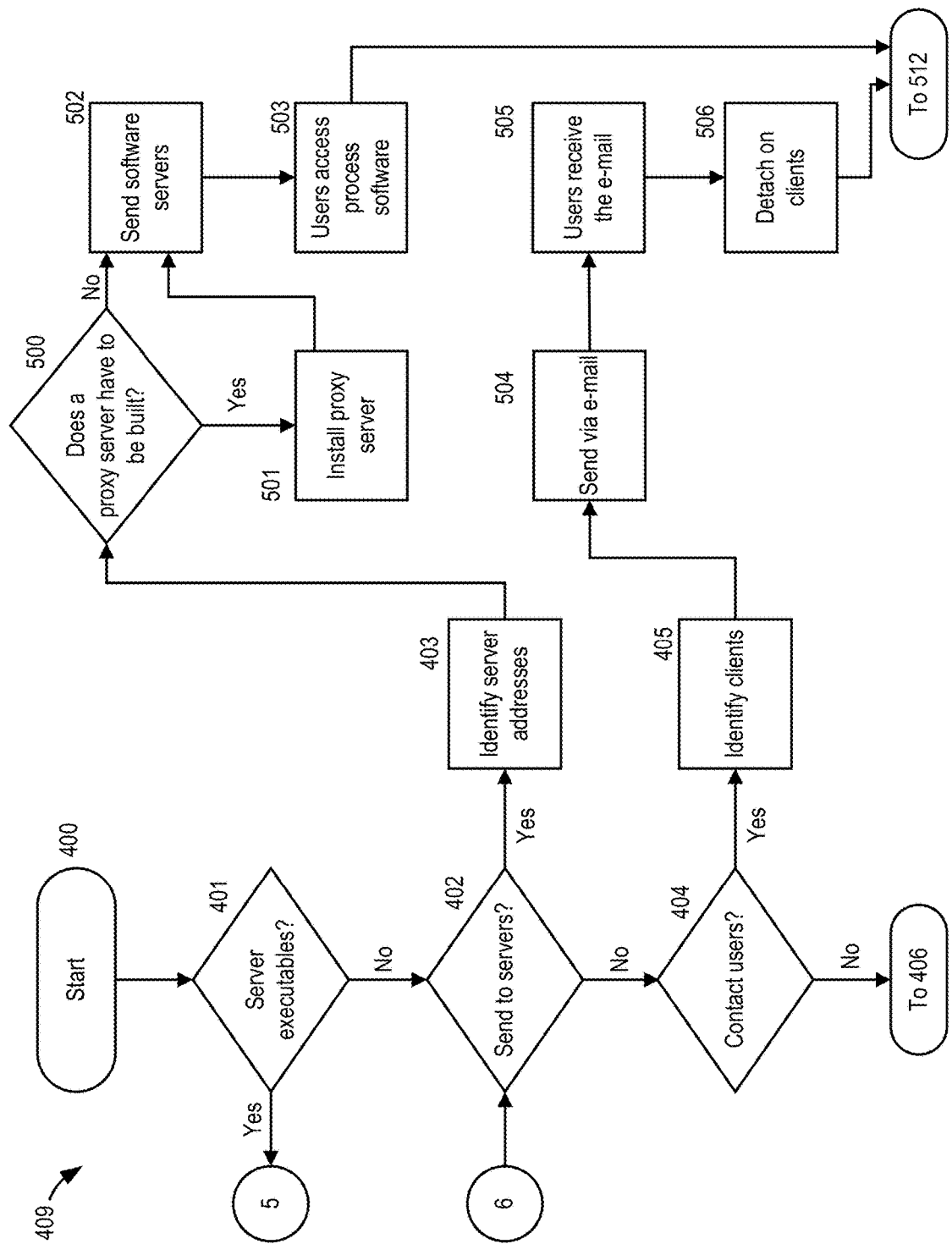
FIG. 4 is a flowchart of a method, in accordance with one approach.
Figure 4:
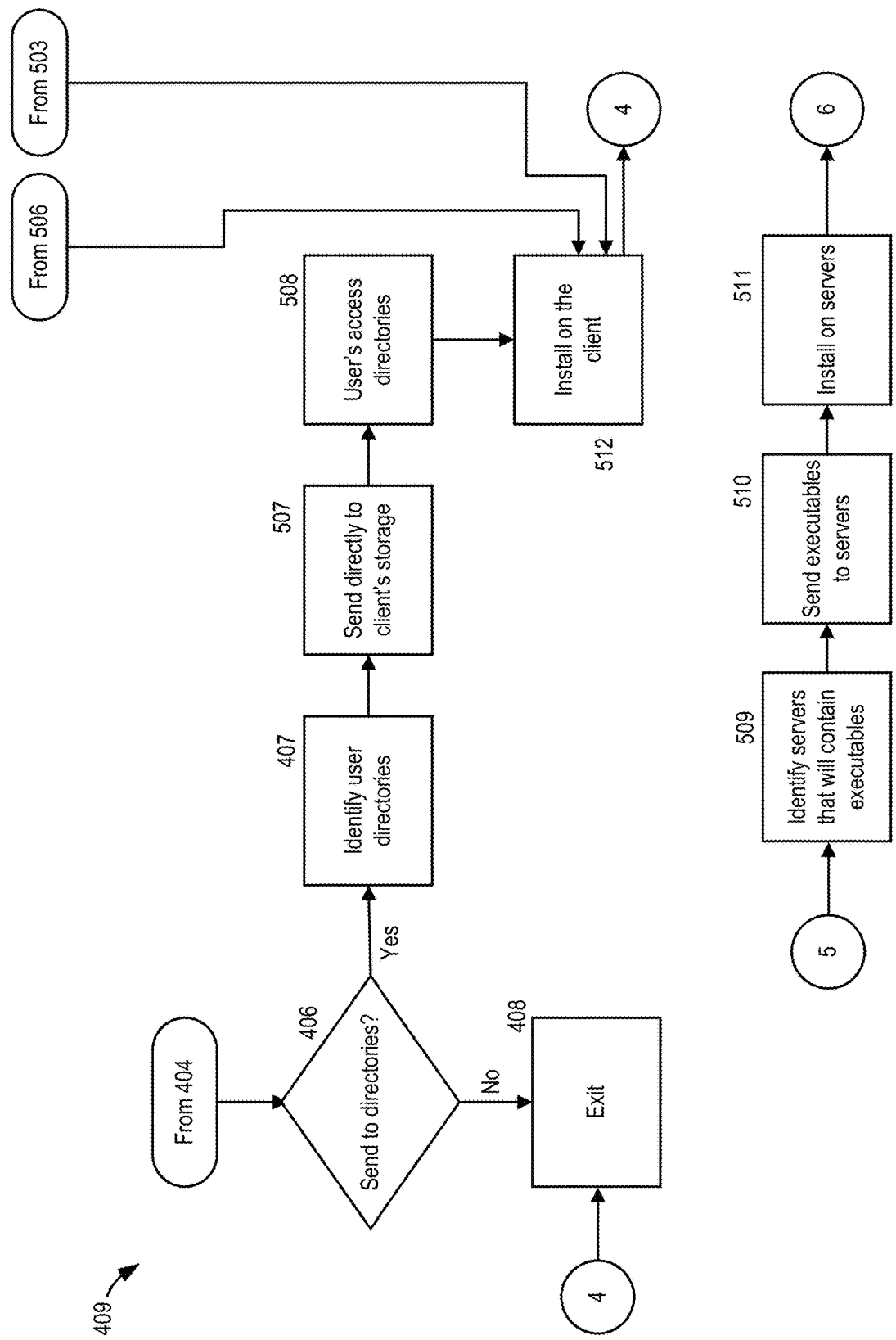

Now referring to FIG. 4, a flowchart of a method 409 is shown according to one approach. The method 409 may be performed in accordance with the present invention in any of the environments depicted in FIGS. 1-3B, among others, in various approaches. Of course, more or fewer operations than those specifically described in FIG. 4 may be included in method 409, as would be understood by one of skill in the art upon reading the present descriptions.

Each of the steps of the method 409 may be performed by any suitable component of the operating environment. For example, in various approaches, the method 409 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 409. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with generating and using surrogate pods to enforce network policies (e.g., Kubernetes network policies) across cluster boundaries, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 409, step 400 begins the deployment of the process software. An initial step is to determine if there are any programs that will reside on a server or servers when the process software is executed 401. If this is the case, then the servers that will contain the executables are identified 509. The process software for the server or servers is transferred directly to the servers' storage via FTP or some other protocol or by copying through the use of a shared file system 510. The process software is then installed on the servers 511.

Next, a determination is made on whether the process software is to be deployed by having clients access the process software on a server or servers 402. If the clients are to access the process software on servers, then the server addresses that will store the process software are identified 403.

A determination is made if a proxy server is to be built 500 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed 501. The process software is sent to the (one or more) servers either via a protocol such as FTP, or it is copied directly from the source files to the server files via file sharing 502. Another approach involves sending a transaction to the (one or more) servers that contained the process software, and have the server process the transaction and then receive and copy the process software to the server's file system. Once the process software is stored on the servers, the clients, via their client computers, then access the process software on the servers and copy to their client computers file systems 503. Another approach is to have the servers automatically copy the process software to each client and then run the installation program for the process software at each client computer. The client executes the program that installs the process software on the client computer 512 and then exits the process 408.

In step 404 a determination is made whether the process software is to be deployed by sending the process software to clients via e-mail. The set of clients where the process software will be deployed are identified together with the addresses of the client computers 405. The process software is sent via e-mail 504 to each of the clients' computers. The clients then receive the e-mail 505 and then detach the process software from the e-mail to a directory on their client computers 506. The client executes the program that installs the process software on the client computer 512 and then exits the process 408.

Lastly, a determination is made on whether the process software will be sent directly to user directories on their client computers 406. If so, the user directories are identified 407. The process software is transferred directly to the clients' computer directory 507. This can be done in several ways such as, but not limited to, sharing the file system directories and then copying from the sender's file system to the recipient client's file system or, alternatively, using a transfer protocol such as File Transfer Protocol (FTP). The clients access the directories on their client file systems in preparation for installing the process software 508. The client executes the program that installs the process software on the client computer 512 and then exits the process 408.

It will be clear that the various features of the foregoing systems and/or methodologies may be combined in any way, creating a plurality of combinations from the descriptions presented above.

It will be further appreciated that approaches herein may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:
   receiving a tunnel request at a service cluster from a client at a remote cluster, the tunnel request including metadata associated with the client at the remote cluster;
   using the metadata to establish a surrogate pod at the service cluster that replicates the client at the remote cluster;
   returning a tunnel identifier corresponding to the established surrogate pod to the remote cluster; and
   in response to receiving a service request that includes the tunnel identifier, causing the service request to be directed to the surrogate pod.

2. The computer-implemented method of claim 1, wherein using the metadata to establish a surrogate pod at the service cluster that replicates the client at the remote cluster includes:
   applying one or more workload-based policies and/or location-based policies to the surrogate pod such that the surrogate pod is configured to modify service requests before causing the modified service requests to be satisfied, wherein the one or more workload-based policies and/or location-based policies correspond to the client at the remote cluster.

3. The computer-implemented method of claim 2, wherein the one or more workload-based policies and/or location-based policies are applied to an existing surrogate pod in the remote cluster.

4. The computer-implemented method of claim 2, wherein the one or more workload-based policies and/or location-based policies include data encryption, wherein the surrogate pod is configured to encrypt and decrypt data.

5. The computer-implemented method of claim 2, wherein the one or more workload-based policies and/or location-based policies include data compression, wherein the surrogate pod is configured to compress and decompress data.

6. The computer-implemented method of claim 1, wherein the surrogate pod is a logical component.

7. The computer-implemented method of claim 1, wherein the surrogate pod is a physical component.

8. The computer-implemented method of claim 1, comprising:
   monitoring services that are offered by the service cluster; and
   outputting a summary of the services offered by the service cluster, the summary being output to the remote cluster.

9. The computer-implemented method of claim 8, wherein the service request corresponds to a first service offered by the service cluster.

10. The computer-implemented method of claim 1, wherein the tunnel request is received at the service cluster from a surrogate pod at the remote cluster, the surrogate pod being correlated with the client.

11. A computer program product, comprising a computer readable storage medium having program instructions embodied therewith, the program instructions readable by a processor, executable by the processor, or readable and executable by the processor, to cause the processor to:
receive a tunnel request at a service cluster from a client at a remote cluster, the tunnel request including metadata associated with the client at the remote cluster;
use the metadata to establish a surrogate pod at the service cluster that replicates the client at the remote cluster;
return a tunnel identifier corresponding to the established surrogate pod to the remote cluster; and
in response to receiving a service request that includes the tunnel identifier, cause the service request to be directed to the surrogate pod.

12. The computer program product of claim 11, wherein using the metadata to establish a surrogate pod at the service cluster that replicates the client at the remote cluster includes:
applying one or more workload-based policies and/or location-based policies to the surrogate pod such that the surrogate pod is configured to modify service requests before causing the modified service requests to be satisfied, wherein the one or more workload-based policies and/or location-based policies correspond to the client at the remote cluster.

13. The computer program product of claim 12, wherein the one or more workload-based policies and/or location-based policies are applied to an existing surrogate pod in the remote cluster.

14. The computer program product of claim 12, wherein the one or more workload-based policies and/or location-based policies include data encryption, wherein the surrogate pod is configured to encrypt and decrypt data.

15. The computer program product of claim 12, wherein the one or more workload-based policies and/or location-based policies include data compression, wherein the surrogate pod is configured to compress and decompress data.

16. The computer program product of claim 11, wherein the surrogate pod is a logical component.

17. The computer program product of claim 11, wherein the surrogate pod is a physical component.

18. The computer program product of claim 11, wherein the program instructions are readable and/or executable by the processor to cause the processor to:
monitor services that are offered by the service cluster; and
output a summary of the services offered by the service cluster, the summary being output to the remote cluster,
wherein the service request corresponds to a first service offered by the service cluster.

19. A system, comprising:
a processor; and
logic integrated with the processor, executable by the processor, or integrated with and executable by the processor, the logic being configured to:
receive a tunnel request at a service cluster from a client at a remote cluster, the tunnel request including metadata associated with the client at the remote cluster;
use the metadata to establish a surrogate pod at the service cluster that replicates the client at the remote cluster;
return a tunnel identifier corresponding to the established surrogate pod to the remote cluster; and
in response to receiving a service request that includes the tunnel identifier, cause the service request to be directed to the surrogate pod.

20. The system of claim 19, wherein using the metadata to establish a surrogate pod at the service cluster that replicates the client at the remote cluster includes:
applying one or more workload-based policies and/or location-based policies to the surrogate pod such that the surrogate pod is configured to modify service requests before causing the modified service requests to be satisfied, wherein the one or more workload-based policies and/or location-based policies correspond to the client at the remote cluster.

* * * * *